(12) United States Patent
Liimatta et al.

(10) Patent No.: US 7,506,503 B2
(45) Date of Patent: Mar. 24, 2009

(54) APPARATUS, SYSTEM, AND METHOD FOR ESTIMATING ASH ACCUMULATION

(75) Inventors: Brian P. Liimatta, Columbus, IN (US); Patrick J. Shook, Franklin, IN (US); J. Steve Wills, Columbus, IN (US); Joan Wills, Nashville, IN (US)

(73) Assignee: Cummins, Inc, Columbus, IN (US)

( * ) Notice: Subject to any disclaimer, the term of this patent is extended or adjusted under 35 U.S.C. 154(b) by 303 days.

(21) Appl. No.: 11/227,828

(22) Filed: Sep. 15, 2005

(65) Prior Publication Data

US 2007/0056270 A1 Mar. 15, 2007

(51) Int. Cl.
*F01N 3/00* (2006.01)
*F01N 3/02* (2006.01)

(52) U.S. Cl. .......................................... 60/297; 60/311
(58) Field of Classification Search ................... 60/297, 60/311
See application file for complete search history.

(56) References Cited

U.S. PATENT DOCUMENTS

| | | | | |
|---|---|---|---|---|
| 4,651,524 | A * | 3/1987 | Brighton | 60/274 |
| 6,405,528 | B1 * | 6/2002 | Christen et al. | 60/295 |
| 6,622,480 | B2 * | 9/2003 | Tashiro et al. | 60/295 |
| 6,666,020 | B2 * | 12/2003 | Tonetti et al. | 60/286 |
| 6,756,904 | B2 | 6/2004 | Kinugawa et al. | 340/606 |
| 6,758,039 | B2 | 7/2004 | Kuboshima et al. | 60/311 |
| 6,829,889 | B2 | 12/2004 | Saito et al. | 60/291 |
| 6,829,890 | B2 * | 12/2004 | Gui et al. | 60/295 |
| 6,854,265 | B2 * | 2/2005 | Saito et al. | 60/295 |
| 6,907,873 | B2 | 6/2005 | Hamahata | 123/676 |
| 6,928,809 | B2 * | 8/2005 | Inoue et al. | 60/297 |
| 7,069,721 | B2 * | 7/2006 | Gotou | 60/297 |
| 7,147,693 | B2 * | 12/2006 | Inoue et al. | 95/273 |
| 2002/0196153 | A1 | 12/2002 | Kinugawa et al. | 340/606 |
| 2003/0167757 | A1 | 9/2003 | Boretto et al. | 60/295 |
| 2004/0172933 | A1 | 9/2004 | Saito et al. | 60/277 |
| 2004/0204818 | A1 | 10/2004 | Trudell et al. | 701/114 |
| 2007/0006577 | A1 * | 1/2007 | Yokoyama et al. | 60/297 |

* cited by examiner

*Primary Examiner*—Thomas Denion
*Assistant Examiner*—Loren Edwards
(74) *Attorney, Agent, or Firm*—Kunzler & McKenzie

(57) ABSTRACT

An apparatus, system, and method are disclosed for estimating ash accumulation. An interpolation module calculates a first particulate accumulation from an interpolation function. An ash feedback module calculates an ash accumulation as an ash feedback function of the first particulate accumulation and a stored first ash accumulation estimate. In one embodiment, an ash feedforward module calculates an added ash estimate. An ash accumulation module may calculate a second ash accumulation estimate as the sum of the ash accumulation and the added ash estimate. A regeneration module may deep clean the filter if the second ash accumulation estimate exceeds an ash threshold. In one embodiment, a soot calculation module calculates a soot accumulation as a second particulate accumulation minus the second ash accumulation estimate.

23 Claims, 13 Drawing Sheets

APPARATUS, SYSTEM, AND METHOD FOR ESTIMATING ASH ACCUMULATION

BACKGROUND OF THE INVENTION

1. Field of the Invention

This invention relates to estimating ash accumulation and more particularly relates to estimating the ash accumulation in a soot filter.

2. Description of the Related Art

Environmental concerns have motivated the implementation of emission requirements for internal combustion engines throughout much of the world. Governmental agencies, such as the Environmental Protection Agency ("EPA") in the United States, carefully monitor the emission quality of engines and set acceptable emission standards, to which all engines must comply. Generally, emission requirements vary according to engine type. Emission tests for compression-ignition or diesel engines typically monitor the release of diesel particulate matter ("PM"), nitrogen oxides ("$NO_x$"), hydrocarbons ("HC"), and carbon monoxide ("CO"). Catalytic converters implemented in an exhaust gas after-treatment system have been used to eliminate many of the pollutants present in exhaust gas. However, to remove diesel particulate matter, typically a diesel particulate filter herein referred to as a filter must be installed downstream from a catalytic converter, or in conjunction with a catalytic converter.

A common filter comprises a porous ceramic matrix with parallel passageways through which exhaust gas passes. Particulate matter accumulates on the surface of the filter, creating a buildup that must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, can be oxidized and driven off of the filter in an event called regeneration. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system that can impair engine performance. Particulate matter, in general, oxidizes in the presence of $NO_2$ at modest temperatures, or in the presence of oxygen at higher temperatures. Excessive soot buildup on the filter can precipitate uncontrolled regeneration of a particulate filter, or, in other words, cause rapid oxidation rates resulting in higher than designed temperatures within the filter. Recovery can be an expensive process.

To prevent potentially hazardous situations, it is desirable to oxidize accumulated particulate matter in a controlled regeneration process before it builds to excessive levels. To oxidize the accumulated particulate matter, temperatures generally must exceed the temperatures typically reached at the filter inlet. Consequently, additional methods to initiate regeneration of a diesel particulate filter must be used. In one method, a reactant, such as diesel fuel, is introduced into an exhaust after-treatment system to generate temperature and initiate oxidation of particulate buildup in the filter. Partial or complete regeneration may occur depending on the duration of time the filter is exposed to elevated temperatures and the amount of particulate matter remaining on the filter. Partial regeneration, caused either by controlled regeneration or uncontrolled regeneration, can contribute to irregular distribution of particulate matter across the substrate of a particulate filter.

Controlled regeneration traditionally has been initiated at set intervals, such as distance traveled or time passed. Interval based regeneration, however, has proven to be ineffective for several reasons. First, regenerating a particulate filter without particulate buildup lessens the fuel economy of the engine and exposes the particulate filter to unnecessary temperature cycles. Secondly, if particulate matter accumulates significantly before the next regeneration, backpressure from blockage of the exhaust flow can negatively affect engine performance. In addition, regeneration (controlled or uncontrolled) of a particulate filter containing large quantities of particulate buildup can potentially cause filter failure or the like. Consequently, particulate filters regenerated on a set interval must be replaced frequently to maintain the integrity of an exhaust gas after-treatment system.

Recently, attempts have been made to estimate the amount of particulate matter accumulated in a particulate filter in order to respond more efficiently to actual particulate buildup. In one method, the backpressure measured across a particulate filter by a differential pressure sensor or algorithm is used to estimate diesel particulate matter accumulation. The soot in the particulate filter may be burned off during regeneration to reduce backpressure in response to a differential pressure-based estimate of the particulate accumulation.

Unfortunately, the accumulation of ash in the particulate filter may distort the differential pressure-based estimate, causing the premature regeneration of the particulate filter. Current methods of estimating accumulated particulates cannot differentiate between soot and ash. In particular, the particulate filter may be regenerated when only a small quantity of soot is present in the filter, expending significant reactant in regeneration for a small improvement in backpressure.

The exhaust gas after-treatment system must also exhibit a maximum allowed backpressure if the engine is to deliver a specified level of power. Unfortunately, the accumulation of ash in the particulate filter increases the backpressure of the exhaust gas after-treatment system. The particulate filter may also require more frequent regeneration to remove soot in order support the maximum allowed backpressure for the engine. An algorithm that distinguishes soot from ash would allow the system to optimize regenerations for soot purposes with regenerations for backpressure purposes, supporting fuel economy, engine performance, and the reliability of aftertreatment systems.

From the foregoing discussion, it should be apparent that a need exists for an apparatus, system, and method that estimate ash accumulation in a particulate filter. Beneficially, such an apparatus, system, and method would enable effective and timely regeneration of a diesel particulate filter based on a more accurate estimate of soot accumulation. In addition, the apparatus, system, and method would increase the fuel economy of a vehicle, extend the life expectancy of a diesel particulate filter, and increase the overall efficiency of an engine.

SUMMARY OF THE INVENTION

The present invention has been developed in response to the present state of the art, and in particular, in response to the problems and needs in the art that have not yet been fully solved by currently available ash estimation methods. Accordingly, the present invention has been developed to provide an apparatus, system, and method for estimating ash accumulation that overcome many or all of the above-discussed shortcomings in the art.

The apparatus to estimate ash accumulation is provided with a logic unit containing a plurality of modules configured to functionally execute the necessary steps of calculating a first particulate accumulation and calculating a second ash accumulation. These modules in the described embodiments include an interpolation module and an ash feedback module.

The interpolation module calculates a first particulate accumulation from an interpolation function. The interpolation function takes a differential pressure and an air flow as inputs. In one embodiment, the interpolation function comprises a plurality of differential pressure value and air flow value pairs for a plurality of particulate functions. Each particulate function specifies a particulate accumulation for a particulate filter hereinafter referred to as the filter for each of the pairs comprising the particulate function.

The ash feedback module calculates an ash accumulation as an ash feedback function of the first particulate accumulation and a stored first ash accumulation estimate. In one embodiment, the ash accumulation is the first particulate accumulation if the first particulate accumulation exceeds the first ash accumulation estimate.

In one embodiment, the apparatus comprises an ash feedforward module. The ash feedforward module calculates an added ash estimate of ash added to the filter since a specified time. For example, the ash feedforward module may calculate the added ash estimate as a function of engine operation time since the specified time. The ash feedforward module may also calculate the added ash estimate as a function of fuel consumption since the specified time. In a certain embodiment, the ash feedforward module calculates the added ash estimate as a function of mileage logged since the specified time.

In one embodiment, the apparatus further comprises an ash accumulation module and a regeneration module. The ash accumulation module may calculate a second ash accumulation estimate as the sum of the ash accumulation and the added ash estimate. The regeneration module may deep clean the filter if the ash accumulated since a previous deep clean exceeds an ash threshold. The apparatus estimates the ash accumulation in the filter, and may direct the regeneration of the filter to both maintain the performance of the filter and to reduce the costs of regenerating the filter.

A system of the present invention is also presented to estimate ash accumulation. The system may be embodied in an exhaust gas after-treatment system of a diesel engine. In particular, the system, in one embodiment, includes a filter, a pressure sensor module, an air-flow sensor module, and a controller. The controller further comprises an interpolation module and an ash feedback module.

The filter is configured to trap particulates from an exhaust gas. In one embodiment, the exhaust gas is from the exhaust gas after-treatment system of the diesel engine. The particulates may include a substantially incombustible ash and a substantially combustible soot. In one embodiment, the system includes a regeneration device. The regeneration device may regenerate the filter by injecting a reactant such as diesel fuel into the filter. The reactant may combust the soot in the filter, reducing the soot accumulation in the filter.

The pressure sensor determines a differential pressure across the filter. In one embodiment, the pressure sensor module comprises a first pressure sensor disposed upstream of the filter and a second pressure sensor disposed downstream of the filter. The pressure sensor module may calculate the differential pressure as the difference in pressure between a first and second pressure sensor. In an alternate embodiment, the pressure sensor module estimates the differential pressure from a single pressure sensor.

The air-flow sensor module determines an air flow through the filter. In one embodiment, the air-flow sensor module measures the air flow. In an alternate embodiment, the air-flow sensor module estimates the air flow from one or more related parameters such as fuel consumption.

The interpolation module calculates a first particulate accumulation from an interpolation function. The ash feedback module calculates an ash accumulation as an ash feedback function of the first particulate accumulation and a stored first ash accumulation estimate. The controller may employ the ash accumulation to determine with increased accuracy when to regenerate the filter using the regeneration device.

A method of the present invention is also presented for estimating ash accumulation. The method in the disclosed embodiments substantially includes the steps necessary to carry out the functions presented above with respect to the operation of the described apparatus and system. In one embodiment, the method includes calculating a first particulate accumulation and calculating an ash accumulation. The method also may include calculating an added ash estimate, calculating a second ash accumulation estimate, and deep cleaning a filter. In addition, the method may include calculating a soot accumulation and regenerating the filter if the soot accumulation exceeds a soot estimate.

An interpolation module calculates a first particulate accumulation from an interpolation function. An ash feedback module calculates an ash accumulation as an ash feedback function of the first particulate accumulation and a stored first ash accumulation estimate. In one embodiment, an ash feedforward module calculates an added ash estimate from a specified time.

In a certain embodiment, an ash accumulation module calculates a second ash accumulation estimate as the sum of the ash accumulation and the added ash estimate. A regeneration module may deep clean the filter if the ash accumulated since a previous deep clean exceeds an ash threshold.

In one embodiment, a soot calculation module calculates a soot accumulation as a second particulate accumulation calculated by the interpolation module minus the second ash accumulation estimate. The regeneration module may regenerate the filter if the soot accumulation exceeds a soot estimate. The method estimates ash accumulation to determine when to regenerate the filter in order to meet filter performance requirements while reducing regeneration costs.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention estimates ash accumulation in a filter and regenerates the filter if the ash accumulation exceeds an ash threshold. In addition, the present invention further estimates soot accumulation and regenerates the filter if the soot accumulation exceeds a soot threshold. The present invention directs the filter regeneration in response to the ash and soot accumulations to both maintain the performance of the filter and to reduce the costs of regeneration. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
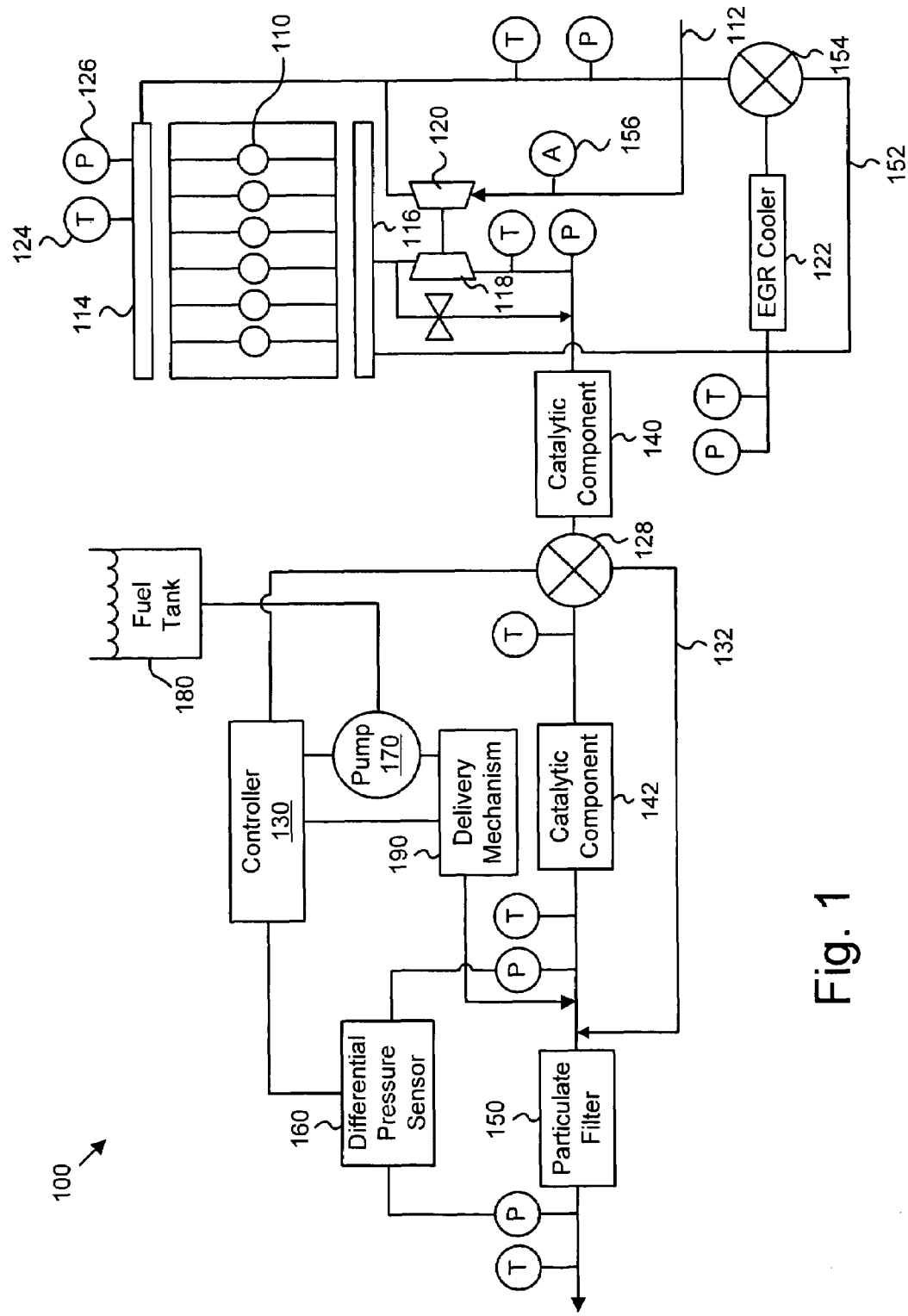
FIG. 1 is a schematic block diagram illustrating one embodiment of an exhaust gas after-treatment system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas after-treatment system 100 in accordance with the present invention. The exhaust gas after-treatment system 100 may be implemented in conjunction with an internal combustion engine 110 to remove various chemical compounds and particulates from emitted exhaust gas. As illustrated, the exhaust gas after-treatment system 100 may include an internal combustion engine 110, controller 130, catalytic components 140, 142, filter 150, differential pressure sensor 160, reactant pump 170, fuel tank 180, and reductant delivery mechanism 190. Exhaust gas treated in the exhaust gas after-treatment system 100 and released into the atmosphere consequently contains significantly fewer pollutants, such as diesel particulate matter, nitrogen oxides, hydrocarbons, and carbon monoxide than untreated exhaust gas.

The exhaust gas after-treatment system 100 may further include an air inlet 112, intake manifold 114, exhaust manifold 116, turbocharger turbine 118, turbocharger compressor 120, engine gas recirculation (EGR) cooler 122, temperature sensors 124, pressure sensors 126, air-flow sensors 156, and an exhaust gas system valve 128. In one embodiment, an air inlet 112 vented to the atmosphere enables air to enter the exhaust gas after-treatment system 100. The air inlet 112 may be connected to an inlet of the intake manifold 114. The intake manifold 114 includes an outlet operatively coupled to the compression chamber of the internal combustion engine 110. Within the internal combustion engine 110, compressed air from the atmosphere is combined with fuel to power the engine 110, which comprises operation of the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the inlet of the exhaust gas after-treatment system valve 128. The exhaust gas may pass through multiple catalytic components 140, 142 and/or particulate filters 150 in order to reduce the number of pollutants contained in the exhaust gas before venting the exhaust gas into the atmosphere. Another portion of the exhaust gas may be re-circulated to the engine 110. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Exhaust gas directed to the exhaust gas after-treatment system valve 128 may pass through a catalytic component 140, such as a hydrocarbon oxidation catalyst or the like, in certain embodiments. Various sensors, such as temperature sensors 124, pressure sensors 126, and the like, may be strategically disposed throughout the exhaust gas after-treatment system 100 and may be in communication with the controller 130 to monitor operating conditions.

The exhaust gas after-treatment system valve 128 may direct the exhaust gas to the inlet of another catalytic component 140, such as a nitrogen oxide adsorption catalyst or the like. Alternatively or in addition, a portion of the exhaust gas may be diverted through the system valve 128 to an exhaust bypass 132. The exhaust gas bypass 132 may have an outlet operatively linked to the inlet of a filter 150, which may comprise a catalytic soot filter in certain embodiments. Particulate matter in the exhaust gas, such as soot and ash, may be retained within the filter 150. The exhaust gas may subsequently be vented to the atmosphere.

In addition to filtering the exhaust gas, the exhaust gas after-treatment system 100 may include a system for introducing a reactant, such as fuel, into the exhaust gas or into components of the exhaust gas after-treatment system 100. The reactant may facilitate regeneration of the filter 150. The fuel tank 180, in one embodiment, may be connected to the reactant pump 170. The pump 170, under direction of the controller 130, may provide fuel or the like to a reactant delivery mechanism 190, such as a nozzle, which may be operatively coupled to the inlet of the catalytic component 142 and/or the filter 150. The exhaust valve 128, reactant pump 170, and reactant delivery mechanism 190 may be directed by the controller 130 to create an environment conducive to oxidation of chemical compounds.

One method to regenerate at least one component of the exhaust gas after-treatment system 100, according to one embodiment, comprises periodically introducing reactant into the filter 150. The controller 130 directs the reactant pump 170 to deliver reactant to the reactant delivery mechanism 190. The controller 130 subsequently regulates the delivery mechanism 190 to deliver selected amounts of reactant into the filter 150. After each injection of reactant, the delivery mechanism 190 may be closed and no additional reactant delivered directly to the catalytic component 142. The effect of this sequence produces a series of injections of reactant into the inlet of the filter 150. As a result, the controller 130 may control the regeneration of the filter 150.

In certain embodiments, the exhaust gas after-treatment system 100 may be configured to determine an appropriate time to introduce reactant into the filter 150. Appropriate timing of regeneration may contribute to an increase in the fuel economy of a vehicle, extended life expectancy of the filter 150, and increased overall efficiency of an engine 110.

Figure 2:
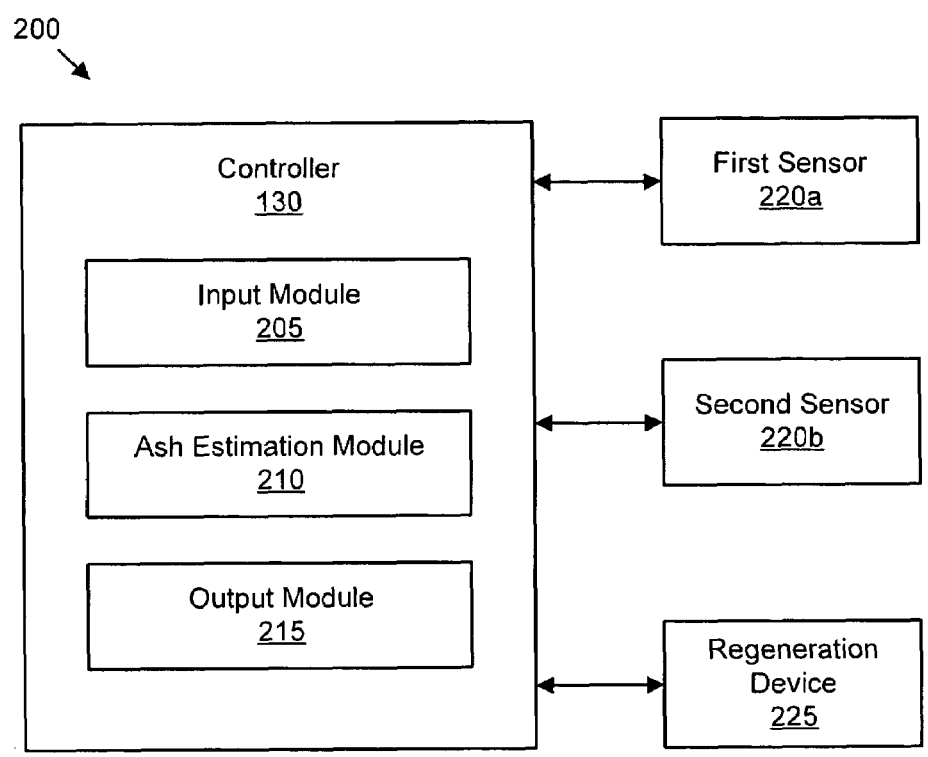
FIG. 2 is a schematic block diagram illustrating one embodiment of a control system of the present invention.

FIG. 2 illustrates one embodiment of a control system 200 in accordance with the present invention. As depicted, the system 200 may include a controller 130, one or more sensors 220, and a regeneration device 225. The controller 130 may include an input module 205, an ash estimation module 210, and an output module 215.

The controller 130 may be the controller 130 of FIG. 1. The input module 205 of the controller 130 may receive input from the sensors 220. The sensors 220 may be the temperature sensors 124, pressure sensors 126, air-flow sensors 156, and differential pressure sensor 160 of FIG. 1.

In one embodiment, the first sensor 220a is a pressure sensor that determines a differential pressure across the filter 150. In one embodiment, the first sensor module comprises a differential pressure sensor 160 such as the differential pressure sensor 160 of FIG. 1 with a first pressure sensor disposed upstream of the filter 150 and a second pressure sensor disposed downstream of the filter 150. The first sensor module 220a may calculate the differential pressure as the difference in pressure between first and second pressure sensor. In an alternate embodiment, the first sensor module 220a estimates the differential pressure from a single pressure sensor 126 such as a pressure sensor 126 of FIG. 1.

In one embodiment, the second sensor module 220b is an air-flow sensor that determines an air flow through the filter 150. In one embodiment, the second sensor module 220b measures the air flow. In an alternate embodiment, the second sensor module 220b estimates the air flow from one or more related parameters such as fuel consumption and/or engine speed.

The ash estimation module 210 is configured to estimate the ash and soot accumulations in a filter 150 such as the filter 150 of FIG. 1. The output module 215 may be configured to control one or more devices such as the regeneration device 230. In one embodiment, the regeneration device 230 comprises the reactant pump 170, reactant delivery mechanism 190, exhaust gas system valve 128, and exhaust bypass 132 of FIG. 1. In one embodiment, the output module 215 controls the regeneration device 230 in response to the ash estimation module 210.

Figure 3:
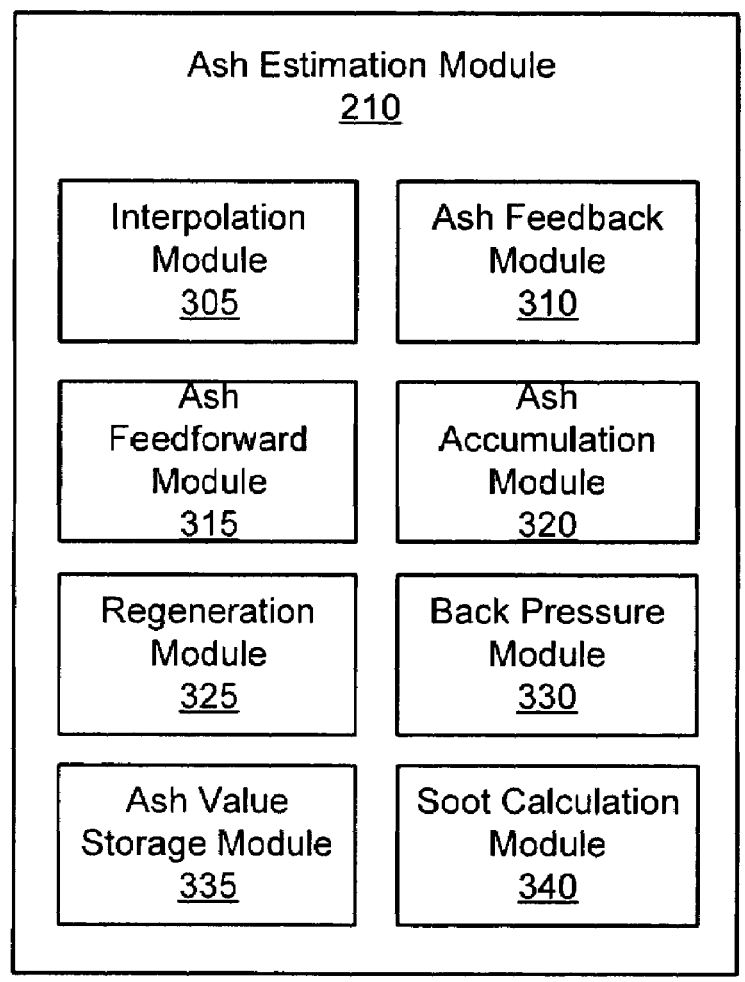
FIG. 3 is a schematic block diagram illustrating one embodiment of an ash estimation module of the present invention.

FIG. 3 is a schematic block diagram illustrating one embodiment of an ash estimation module 210 of the present embodiment. The ash estimation module 210 may be the ash estimation module 210 of FIG. 2. As depicted, the ash estimation module 210 includes an interpolation module 305, ash feedback module 310, ash feedforward module 315, ash accumulation module 320, regeneration module 325, back pressure module 330, ash value storage module 335, and soot calculation module 340. In one embodiment, one or more software processes comprise the interpolation module 305, ash feedback module 310, ash feedforward module 315, ash accumulation module 320, regeneration module 325, back pressure module 330, ash value storage module 335, and soot calculation module 340.

The interpolation module 305 calculates a first particulate accumulation using an interpolation function. The interpolation function employs a differential pressure input from a sensor 220 such as the first sensor 220a of FIG. 2. In addition, the interpolation function employs an air-flow input from a sensor 220, such as the second sensor 220b of FIG. 2.

The ash feedback module calculates a second ash accumulation using an ash feedback function. The ash feedback function uses the first particulate accumulation and a stored first ash accumulation estimate. In one embodiment, the ash value storage module 335 stores the first ash accumulation estimate.

The ash feed forward module 315 may calculate an added ash estimate. In one embodiment, the added ash estimate is calculated from a specified time. The specified time may begin with a deep clean of a filter 150 such as the filter 150 of FIG. 1. The ash accumulation module 320 may calculate a second ash accumulation estimate as the sum of the ash accumulation and the added ash estimate. In a certain embodiment, the regeneration module 325 regenerates the filter 150 if the ash accumulation from a previous deep clean exceeds an ash threshold.

The back pressure module 330 projects a high air-flow back pressure from a second particulate accumulation calculated by the interpolation module and a differential pressure and air-flow input. In addition, the back pressure module 330 may direct the regeneration of the filter 150 if the back pressure projection exceeds a specified pressure value.

The soot calculation module 340 calculates a soot accumulation as a second particulate accumulation calculated by the interpolation module 305 minus the second ash accumulation estimate. In addition, the soot calculation module 340 may direct the con regeneration module to regenerate the filter 150 if the soot accumulation exceeds a soot threshold.

Figure 4:
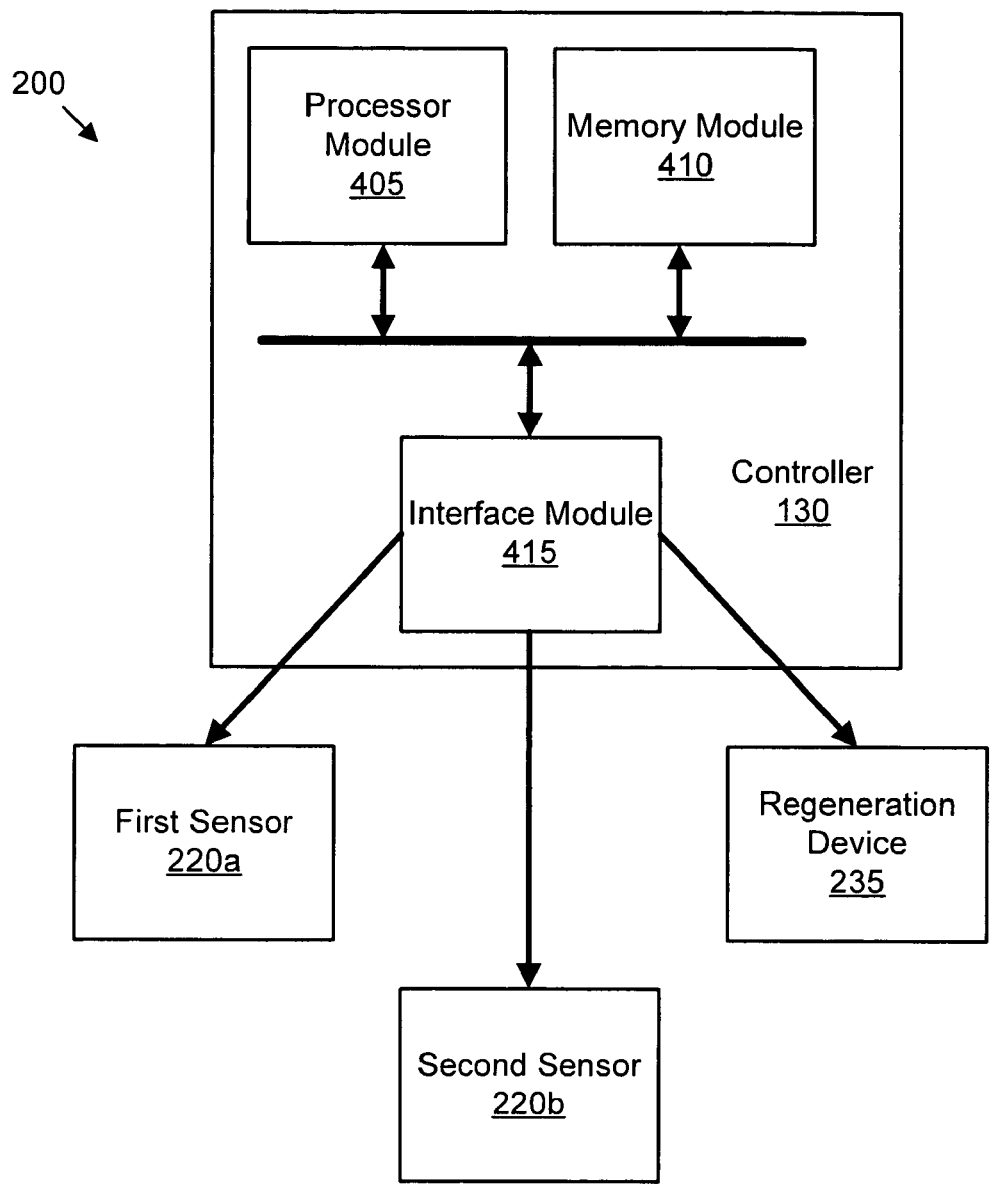
FIG. 4 is a schematic block diagram illustrating another embodiment of a control system in accordance with the present invention.

FIG. 4 is a schematic block diagram illustrating another embodiment of the control system 200 of FIG. 2. The controller 130 is depicted as comprising a processor module 405, memory module 410, and interface module 415. The processor module 405, memory module 410, and interface module 415 may be fabricated of semiconductor gates on one or more semiconductor substrates. Each semiconductor substrate may be packaged in one or more semiconductor devices mounted on circuit cards. Connections between the processor module 405, the memory module 410, and the interface module 425 may be through semiconductor metal layers, substrate to substrate wiring, or circuit card traces or wires connecting the semiconductor devices.

The memory module 410 stores software instructions and data comprising one or more software processes. The processor module 405 executes the software processes as is well known to those skilled in the art. In one embodiment, the processor module 405 executes one or more software processes comprising the interpolation module 305, ash feedback module 310, ash feedforward module 315, ash accumulation module 320, regeneration module 325, back pressure module 330, ash value storage module 335, and soot calculation module 340 of FIG. 3.

The processor module 405 may communicate with external devices and sensors such as the first and second sensor 220 and the regeneration device 225 of FIG. 2 through the interface module 415. For example, the first sensor module 220a may be a pressure sensor 126 such as a pressure sensor 126 of FIG. 1. The first sensor module 220a may communicate an analog signal representing a pressure value to the interface module 415. The interface module 415 may periodically convert the analog signal to a digital value and communicate the digital value to the processor module 405.

The interface module 215 may also receive one or more digital signals through a dedicated digital interface, a serial digital bus communicating a plurality of digital values, or the like. For example, the second sensor module 220b may be the air-flow sensor 156 of FIG. 1 and communicate a digital air flow value to the interface module 215. The interface module 215 may periodically communicate the digital air flow value to the processor module 405.

The processor module 405 may store received values in the memory module 410. In addition, the processor module 405 may employ the received values in one or more calculations including calculations comprised by the interpolation module 305, ash feedback module 310, ash feedforward module 315, ash accumulation module 320, regeneration module 325, back pressure module 330, ash value storage module 335, and soot calculation module 340. The processor module 405 may also control one or more devices such as the regeneration device 225 through the interface module 215.

Figure 5A:
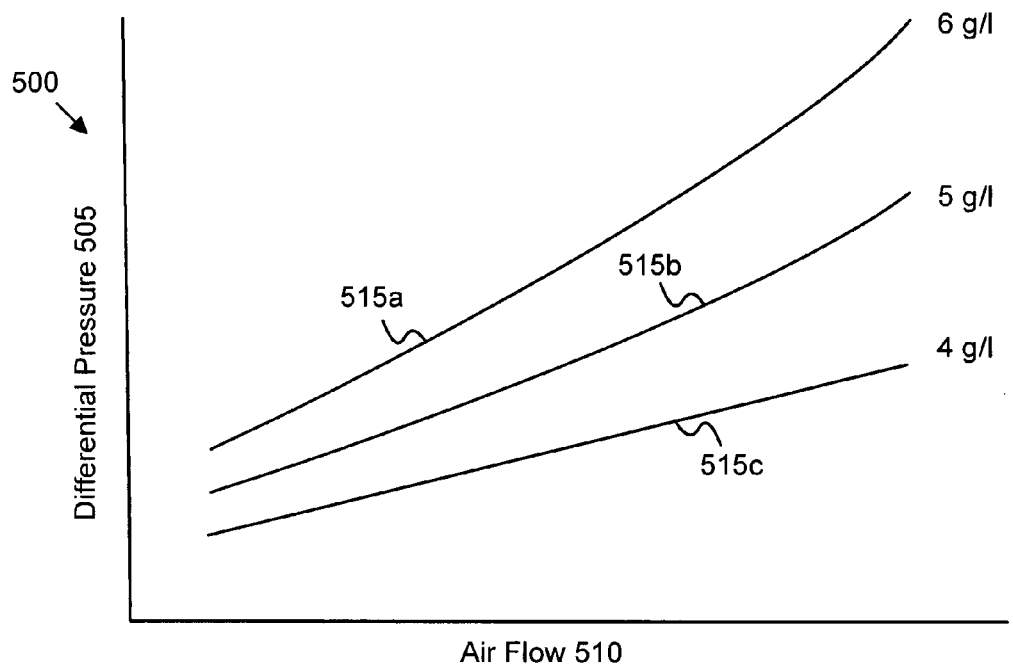
FIG. 5A is a graph illustrating one embodiment of an interpolation function of the present invention.

FIG. 5A is a graph illustrating one embodiment of an interpolation function 500 of the present invention. The function 500 includes a plurality of particulate functions 515. Each particulate function 515 specifies a particulate accumulation. For example, a first particulate function 515a as depicted specifies a particulate accumulation of 6 grams of particulate per liter of filter 150 volume (6 g/l) while a second particulate function 515b specifies 5 g/l and a third particulate function 515c specifies 4 g/l.

Each particulate function 515 comprises a plurality of differential pressure 505 value and air flow 510 value pairs. In one embodiment, the differential pressure 505 value is a function of the air flow 510 value. In a certain embodiment, the differential pressure 505 value is a linear function of the air flow 510 value.

Figure 5B:
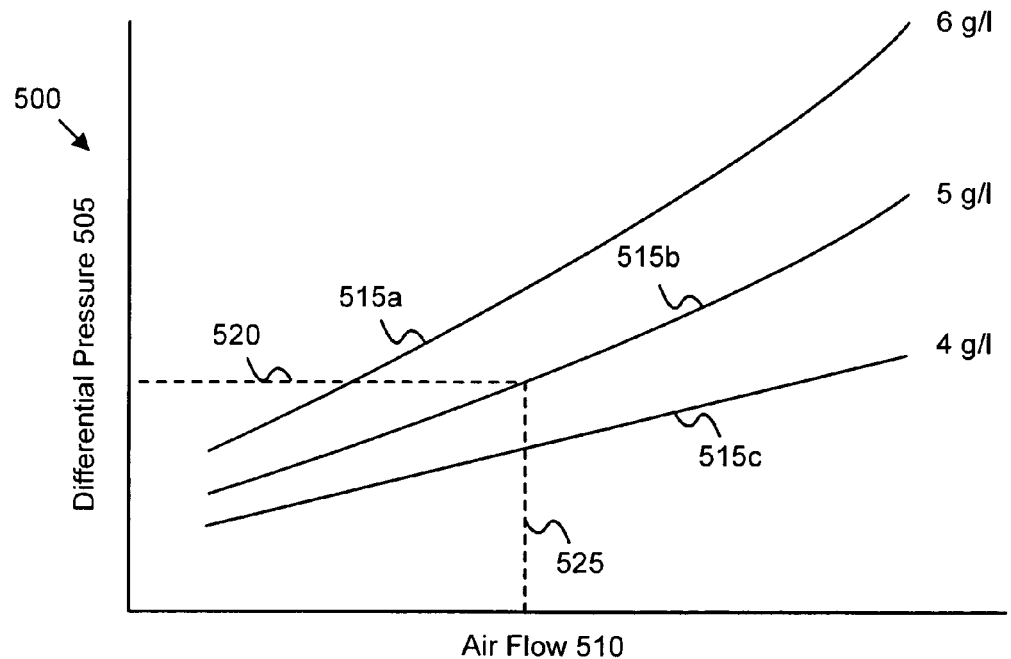
FIG. 5B is a graph illustrating one embodiment of determining a particulate accumulation using an interpolation function of the present invention.

FIG. 5B is a graph illustrating one embodiment of determining a particulate accumulation using an interpolation function 500 of the present invention. The interpolation function 500 may be the interpolation function 500 of FIG. 5A with a specified differential pressure value 520 and a specified air flow value 525. The differential pressure value 520 and air flow value 525 are a pair comprised by a single second particulate function 515b. As depicted, the interpolation function yields a particulate accumulation of 5 g/l for the differential pressure value 520 and air flow value 525 pair.

Figure 5C:
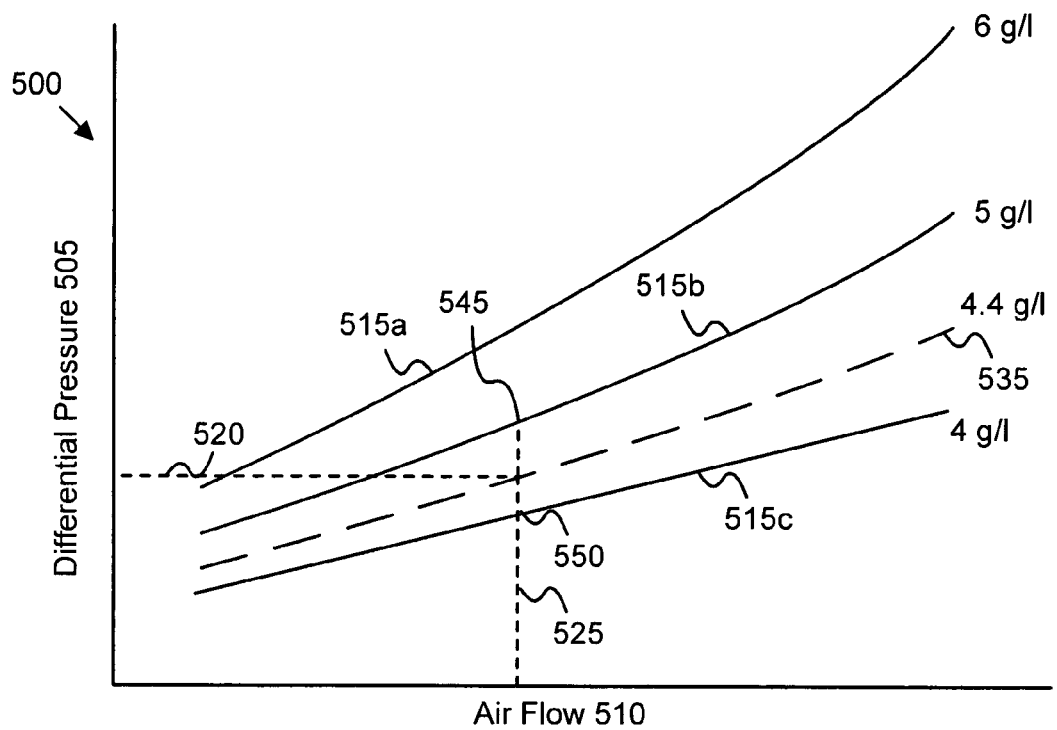
FIG. 5C is a graph illustrating one embodiment of interpolating a particulate accumulation using an interpolation function of the present invention.

FIG. 5C is a graph illustrating one embodiment of interpolating a particulate accumulation using an interpolation function 500 of the present invention. The interpolation function 500 may be the interpolation function of FIG. 5A with a specified differential pressure value 520 and a specified air flow value 525. The differential pressure value 520 and air flow value 525 pair are not comprised by a single particulate function 515.

In the depicted embodiment, an interpolated particulate function 535 is interpolated from a second and third particulate function 515b, 515c. In an alternate embodiment, the interpolated particulate function 535 is interpolated from a single particulate function 515 such as the second or third particulate function 515b, 515c. The interpolated particulate function 535 comprises the differential pressure value 520 and air flow value 525 pair.

A particulate accumulation is also interpolated for the interpolated particulate function 535. The particulate accumulation may be interpolated from the second and third particulate functions' 515b, 515c particulate accumulation values. As depicted, the particulate accumulation for interpolated particulate function 535 is 4.4 g/l.

In one embodiment, the particulate accumulation A for the interpolated particulate function 535 is calculated using Equation 1 where $P_1$ is the differential pressure value 520 for the air flow value 525, $A_1$ is the accumulation value of the third particulate function 515c, $A_2$ is the accumulation value of the second particulate function 515b, $P_1$ is the differential pressure value 550 of the air flow value 525 for the third particulate function 515c, and $P_2$ is the differential pressure value 545 of the specified air flow value 525 for the second particulate function 515b.

$$A = (A_2 - A_1)\left(\frac{P_1 - P_1}{P_2 - P_1}\right) + A_1 \quad \text{Equation 1}$$

Figure 5D:
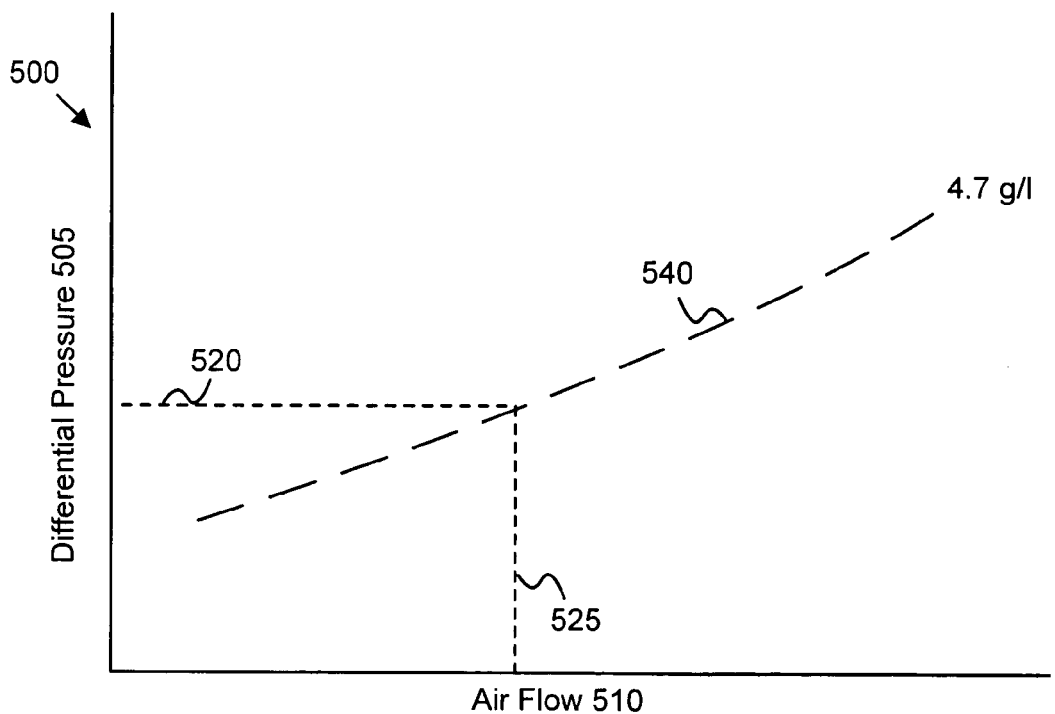
FIG. 5D is a graph illustrating one alternate embodiment of an interpolation function of the present invention.

FIG. 5D is a graph illustrating one alternate embodiment of an interpolation function 500. As depicted, a particulate function 540 is calculated for each differential pressure value 520 and air-flow value 525 pair. In addition, a particulate accumulation is calculated for each calculated particulate function 540. As depicted, the particulate accumulation for the calculated particulate function 540 is 4.7 g/l.

Figure 6:
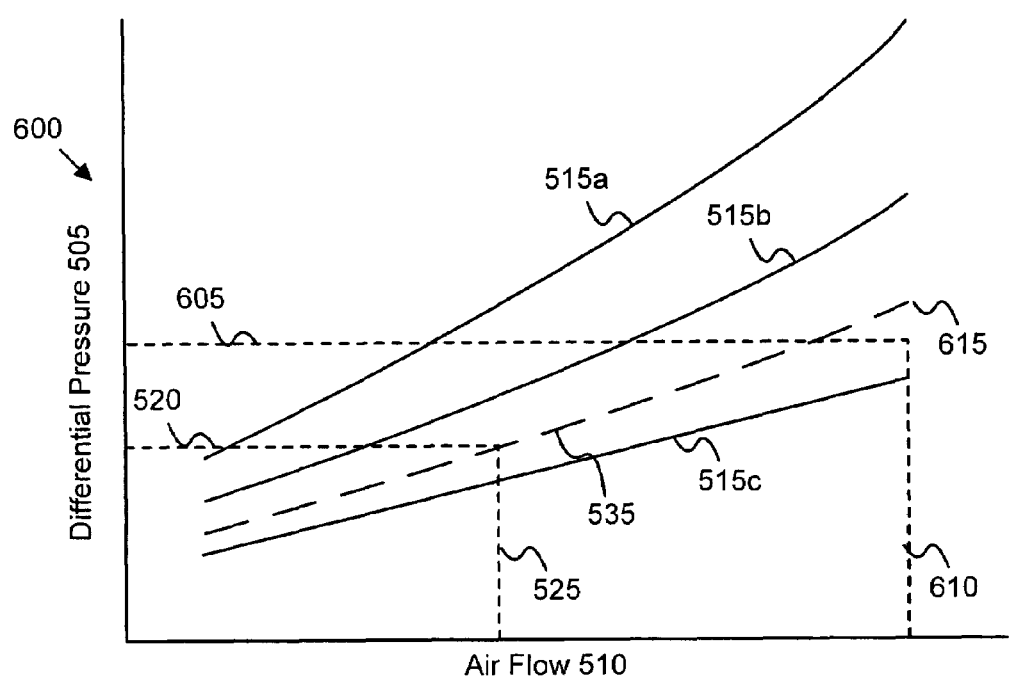
FIG. 6 is a graph illustrating one embodiment of back pressure projection of the present invention.

FIG. 6 is a graph illustrating one embodiment of back pressure projection 600 of the present invention. In the depicted embodiment, the back pressure projection 600 employs the interpolation function 500 of FIG. 5C. As in FIG. 5C, an interpolated particulate function 535 is interpolated for a differential pressure value 520 and air flow value 525 pair. A high air-flow pressure 615 of the interpolated particulate function 535 for a high air-flow 610 is projected. The high air-flow 610 may be a maximum air flow 510 that a filter 150 such as the filter of FIG. 1 is required to support. The projected high-air flow pressure 615 is compared with a specified pressure value 605. The specified pressure value 605 is a maximum back pressure allowed by the system. In one example, this may be the maximum back pressure the engine can tolerate and still meet its rated power requirement. The projected high air-flow pressure 615 exceeding the specified pressure value 605 as depicted is indicative that the filter 150 should be regenerated.

Figure 7:
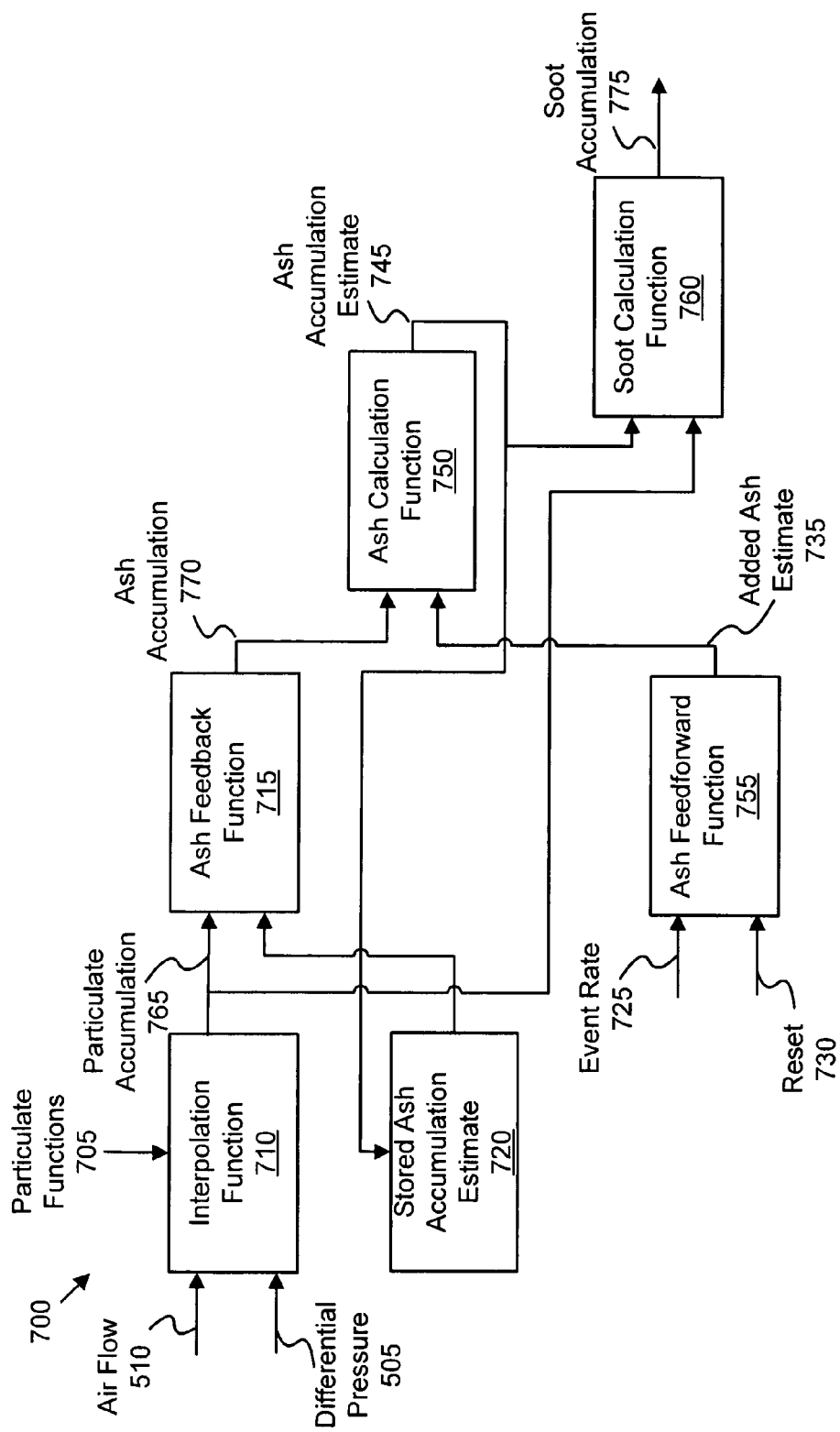
FIG. 7 is a chart illustrating one embodiment of an ash estimation method of the present invention.

FIG. 7 is a chart illustrating one embodiment of an ash estimation method 700 of the present invention. The method 700 depicts stored values and functions employed by the interpolation module 305, ash feedback module 310, ash feedforward module 315, ash accumulation module 320, regeneration module 325, back pressure module 330, ash value storage module 335, and soot calculation module 340 of FIG. 3.

The interpolation module 305 calculates a particulate accumulation 765 from a differential pressure 505 and an air flow 510 using an interpolation function 710. The interpolation function 710 may be the interpolation function 500 of FIGS. 5A-D. In one embodiment, the interpolation function 710 employs a plurality of particulate functions 705 such as the particulate functions 515 of FIGS. 5A-D. The particulate functions 705 may be measured for a specified filter 150 such as the filter 150 of FIG. 1.

The ash feedback module 310 calculates an ash accumulation 770 using an ash feedback function 715 from the particulate accumulation 765 and a stored first ash accumulation estimate 720. The ash value storage module 335 may store the stored first ash accumulation estimate 720.

The ash feedforward module 315 calculates an added ash estimate 735 using an ash feedforward function 755. The ash feedforward function 755 calculates the added ash estimate 735 as a function of an event rate 725 related to the accumulation of ash in the filter 150. For example, the added ash estimate 735 may be a function of fuel consumption and the event rate 725 may be a fuel consumption estimate. The ash feedforward function 755 may multiply the fuel consumption estimate by a constant such as 4 grams of ash per 10,000 liters of fuel consumed (0.0004 g/l). Thus if 1,000 liters of fuel are consumed, the ash feedforward function 755 may calculate the added ash estimate 735 as 0.4 grams of ash.

In one embodiment, the ash feedforward function 755 is reset by a reset input 730. The reset input 730 may be responsive a deep clean of the filter 150. Thus, immediately subsequent to a deep clean of the filter 150 the added ash estimate 735 may be reset to a measured or specified value.

The ash accumulation module 320 calculates an ash accumulation estimate 745 using an ash calculation function 750. The ash calculation function 750 may sum the ash accumulation 770 and the added ash estimate 735 as the ash accumulation estimate 745. The ash accumulation estimate 745 may be stored as the stored first ash accumulation estimate 720 in the ash value storage module 335.

The soot calculation module 340 calculates soot accumulation 775 using the soot calculation function 760. The soot calculation function 760 employs the ash accumulation estimate 745 and a particulate accumulation 765 calculated by the interpolation function 710 from specified differential pressure 505 and air flow 510 inputs. The soot calculation function 760 calculates the soot accumulation 775 as the particulate accumulation 765 minus the added ash estimate 745.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
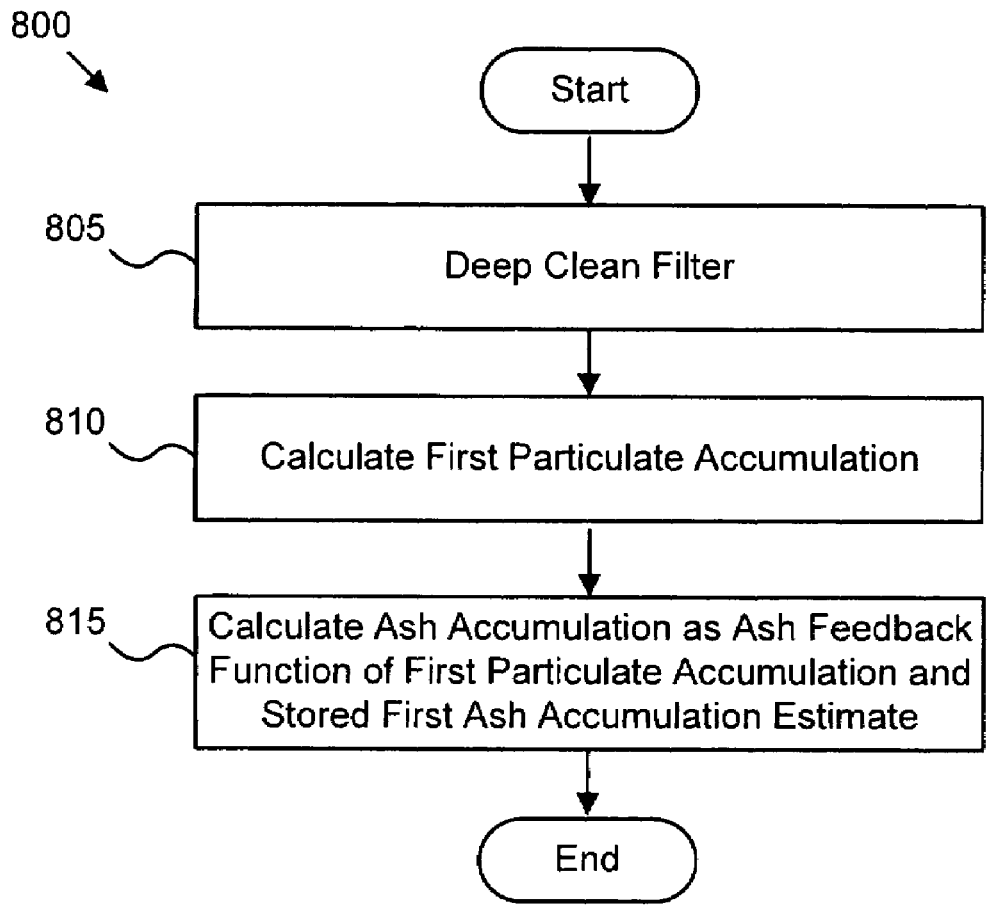
FIG. 8 is a schematic flow chart diagram illustrating one embodiment of an ash accumulation calculation method of the present invention.

FIG. 8 is a schematic flow chart diagram illustrating one embodiment of an ash accumulation calculation method 800 of the present invention. The method 800 substantially includes the steps necessary to carry out the functions presented above with respect to the operation of the described ash estimation module 210 and system 100 of FIGS. 1-7. The devices, modules, and functions of the method 800 may be the devices, modules, and functions described in FIGS. 1-7.

The method 800 begins and in one embodiment, a regeneration device 225 deep cleans 805 a filter 150. The regeneration device 225 may deep clean the filter 150 by injecting sufficient reactant to consume all soot in the filter 150. An interpolation module 305 calculates 810 a first particulate accumulation 765 using a differential pressure 505 and air flow 510 as inputs to an interpolation function 710.

An ash feedback module 310 calculates 815 an ash accumulation 770 using an ash feedback function 715. The ash accumulation 770 represents a measure of ash in the filter 150 immediately subsequent to the deep clean and provides feedback that improves the accuracy of subsequent ash accumulation estimates 745. The method 800 calculates a first particulate accumulation 765 and an ash accumulation 770 that may be used to determine when to regenerate the filter 150.

Figure 9:
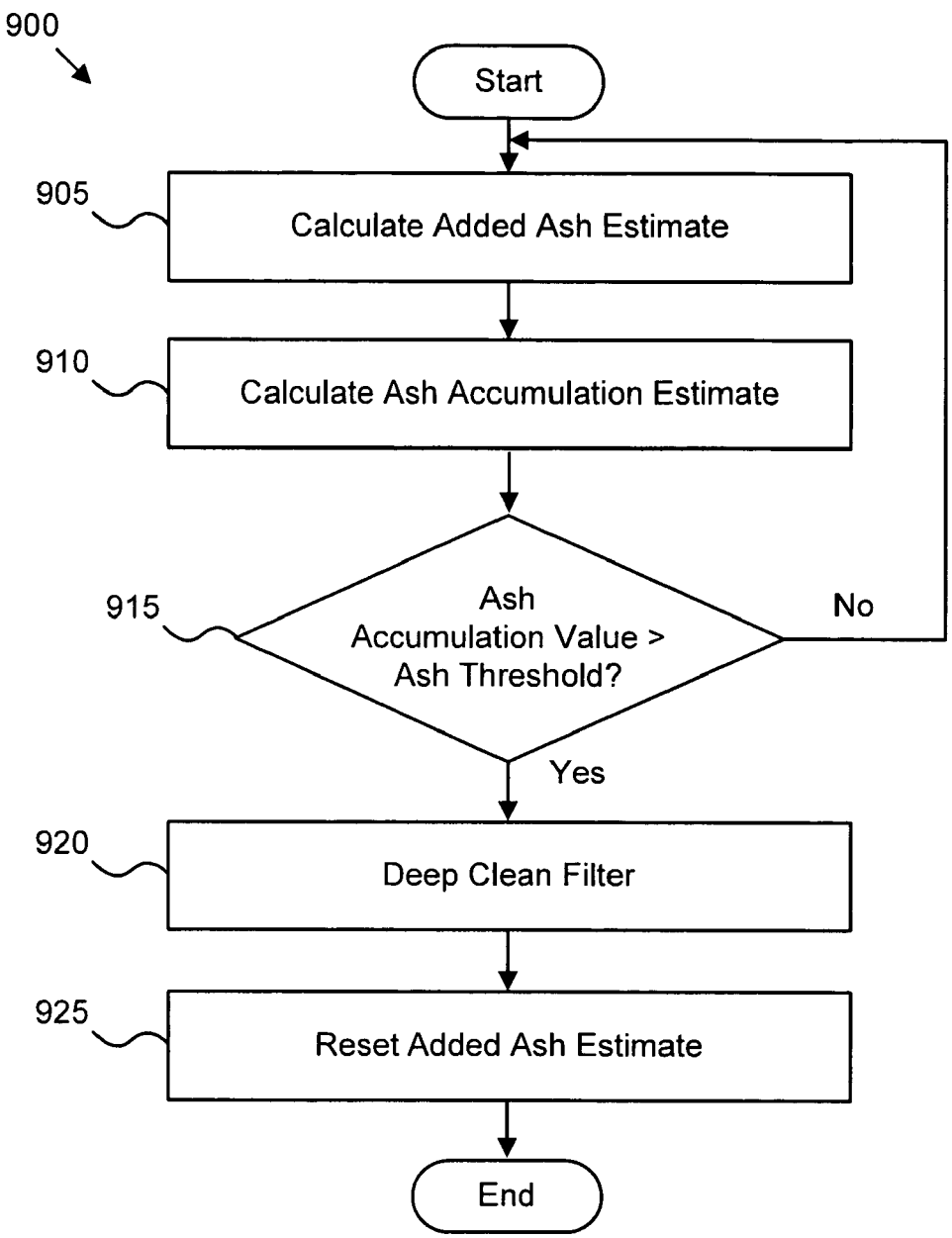
FIG. 9 is a schematic flow chart diagram illustrating one embodiment of an ash accumulation estimate calculation method of the present invention.

FIG. 9 is a schematic flow chart diagram illustrating one embodiment of an ash accumulation estimate calculation 900 method of the present invention. The method 900 substantially includes the steps necessary to carry out the functions presented above with respect to the operation of the described ash estimation module 210 and system 100 of FIGS. 1-7. The devices, modules, and functions of the method 900 may be the devices, modules, and functions described in FIGS. 1-7.

The method 900 begins and in one embodiment, an ash feedforward module 315 employs an ash feedforward function 755 to calculate 905 an added ash estimate 735. In one embodiment, the ash feedforward function 755 calculates 905 the added ash estimate 735 as an event rate 725 multiplied by a constant. For example, the event rate 725 may be the operating time of an engine 110 and the constant may specify grams of ash per hour (g/h) of engine 110 operation. Thus if the engine operation event rate 725 is 1,000 hours and the constant is 0.0002 g/h, the ash feedforward function 755 calculates 905 the added ash estimate 735 as 0.2 grams of ash.

In one embodiment, an ash accumulation module 320 uses an ash calculation function 750 to calculate 910 an ash accumulation estimate 745. In one embodiment, the ash accumulation estimate 745 is the sum of an ash accumulation 770 such as the ash accumulation 770 of FIG. 8 and the added ash estimate 735.

In one embodiment, a regeneration module 325 determines 915 if an ash accumulation value exceeds an ash threshold. The ash threshold may be a specified weight of ash such as 25 g. In one embodiment, the ash accumulation value is the added ash estimate 735. In an alternate embodiment, the ash accumulation value is the ash accumulation estimate 745.

If the ash accumulation value exceeds the ash threshold, the regeneration module 325 directs the deep cleaning 920 of a filter 150. In one embodiment, the regeneration module 325 further resets 925 the added ash estimate 735 to a specified initial value and the method 900 terminates. In a certain embodiment, the method 900 terminates by proceeding to step 810 of method 800 of FIG. 8. If the ash accumulation value does not exceed the ash threshold, the method 900 loops and the ash feedforward module 315 continues to calculate 905 the added ash estimate 735. The method 900 determines when to deep clean 920 the filter 150 in response to ash accumulation.

Figure 10:
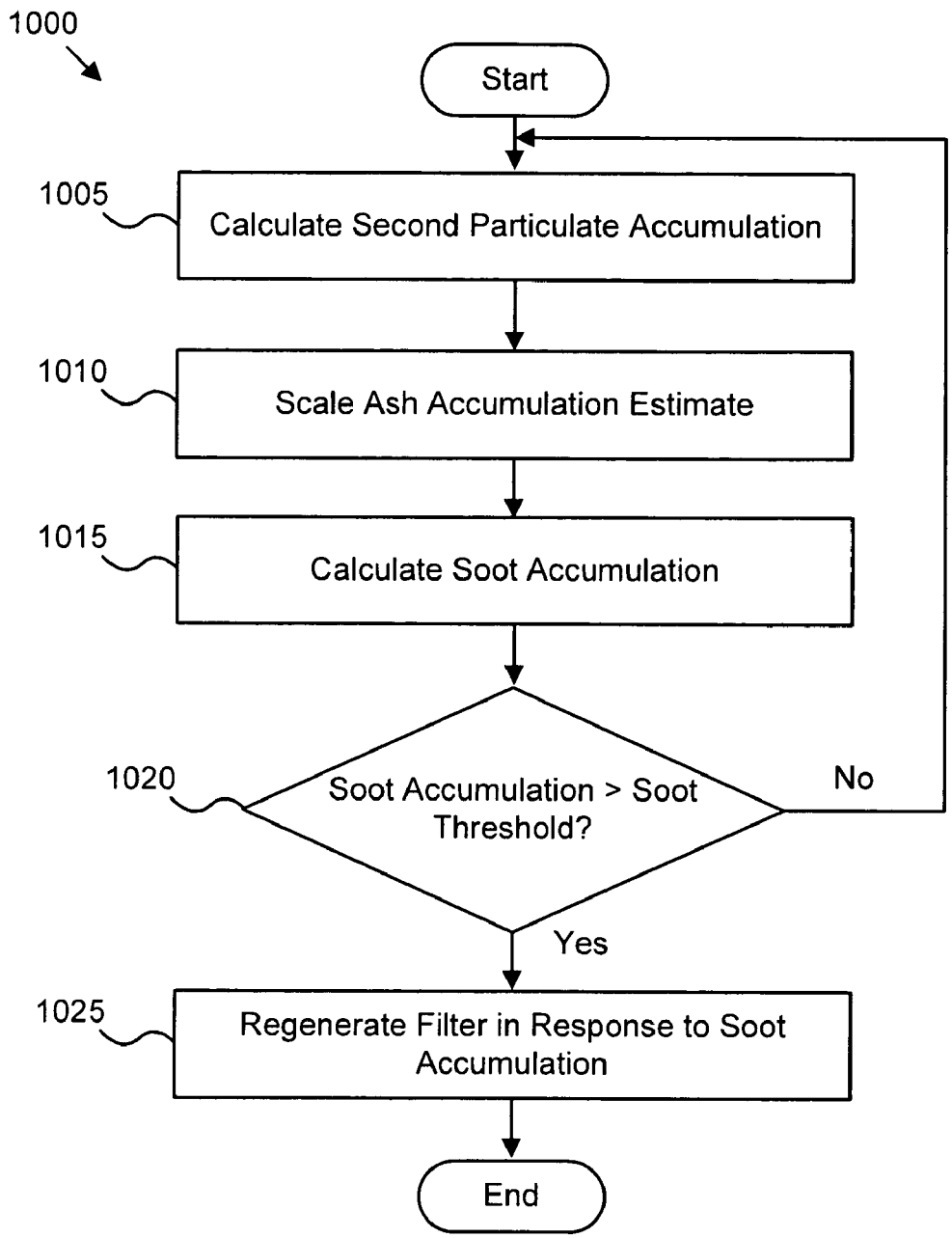
FIG. 10 is a schematic flow chart diagram illustrating one embodiment of a soot accumulation calculation method of the present invention.

FIG. 10 is a schematic flow chart diagram illustrating one embodiment of a soot accumulation calculation method 1000 of the present invention. The method 1000 substantially includes the steps necessary to carry out the functions presented above with respect to the operation of the described ash estimation module 210 and system 100 of FIGS. 1-7. The devices, modules, and functions of the method 1000 may be the devices, modules, and functions described in FIGS. 1-7.

In one embodiment, an interpolation module 305 calculates 1005 a second particulate accumulation 765 from a differential pressure 505 and an air flow 510. A soot calculation module 340 may scale 1010 an ash accumulation estimate 745 such as the as the accumulation estimate 745 of FIGS. 7 and 9 to a soot equivalent of the ash accumulation estimate 745. In one embodiment, the soot calculation module 340 multiplies the ash accumulation estimate by a constant such as a constant specifying grams of soot per gram of ash (g/g). For example, if the constant specifies 1 gram of soot per 2 grams of ash (0.5 g/g) and if the ash accumulation estimate 745 is 200 g, the soot calculation module 340 scales 1010 the ash accumulation estimate 745 to an equivalent 100 grams of soot.

In one embodiment, the soot calculation module 340 further calculates 1015 a soot accumulation 775 using a soot calculation function 760. The soot calculation function 760 may calculate the soot accumulation 775 as the second particulate accumulation 765 minus the ash accumulation estimate 745. In an alternate embodiment, the soot calculation module 340 further calculates 1015 a soot accumulation 775 using a soot calculation function 760 as the second particulate accumulation 765 minus the soot equivalent of the ash accumulation estimate 745.

The soot calculation module 340 determines 1020 if the soot accumulation 775 exceeds a soot threshold. The soot threshold may be a weight of soot such as 50 g. A soot accumulation 775 of 60 g exceeds a soot threshold of 50 g. If the soot accumulation 775 does not exceed the soot threshold, the method 1000 loops and the interpolation module 305 calculates 1005 the second particulate accumulation 765. If the soot accumulation 775 does exceed the soot threshold, the soot calculation module 340 directs the regeneration module 325 to regenerate 1025 a filter 150 and the method 1000 terminates. The method 1000 calculates 1015 soot accumulation 775 and determines when to regenerate 1025 the filter 150 in response to the soot accumulation 775.

Figure 11:
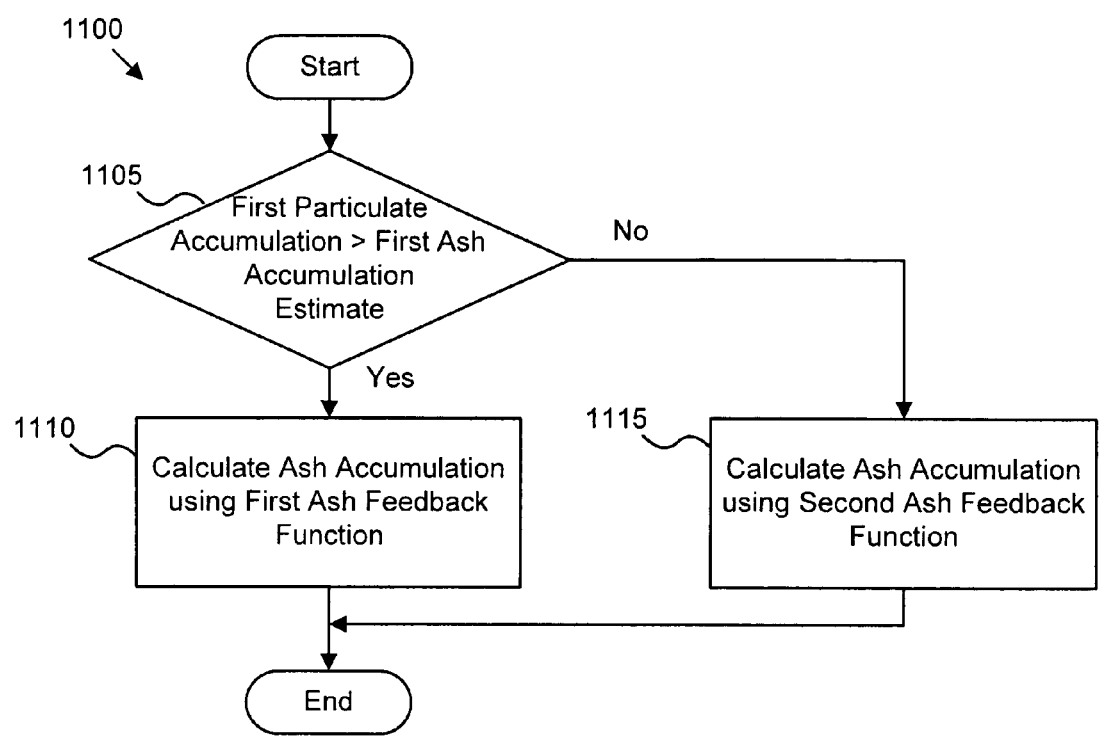
FIG. 11 is a schematic flow chart diagram illustrating one embodiment of an ash feedback function selection method of the present invention.

FIG. 11 is a schematic flow chart diagram illustrating one embodiment of an ash feedback function selection method 1100 of the present invention. The method 1100 substantially includes the steps necessary to carry out the functions presented above with respect to the operation of the described ash estimation module 210 and system 100 of FIGS. 1-7. The devices, modules, and functions of the method 1100 may be the devices, modules, and functions described in FIGS. 1-7. In one embodiment, the method 1100 is comprised by step 815 of method 800 of FIG. 8.

In one embodiment, an ash feedback module 310 determines 1105 if a first particulate accumulation 765 such as the first particulate accumulation 765 of FIG. 8 exceeds a stored first ash accumulation estimate 720 such as is stored by the ash value storage module 335. If the first particulate accumulation 765 exceeds the first ash accumulation estimate 720, for example the amount of ash in the filter appears to be increasing, the ash feedback module 310 calculates 1110 an ash accumulation 770 using a first ash feedback function 710. In one embodiment, the first ash feedback function 715 yields an ash accumulation 770 A as defined by Equation 2 where $A_1$ is the first particulate accumulation 765 and $A_2$ is the first ash accumulation estimate 720, and where b is a constant in the range of 0-1, preferably in the range 0.5 to 1.0.

$$A = A_1(b) + A_2(1-b) \qquad \text{Equation 2}$$

If the first particulate accumulation 765 does not exceed the first ash accumulation estimate 720, i.e. it appears that the amount of ash in the filter is decreasing, the ash feedback module 310 calculates 1115 the ash accumulation 770 using a second ash feedback function 710. In one embodiment, the second ash feedback function 715 yields an ash accumulation 770 A as defined by Equation 2 where $A_1$ is the first particulate accumulation 765 and $A_2$ is the first ash accumulation estimate 720, and where b is a constant in the range of 0-1, preferably in the range 0.25 to 0.75. The method 1100 filters an unexpected particulate accumulation 765 such as a particulate accumulation 765 that is less than the first ash accumulation estimate 720, preventing an erroneous particulate accumulation 765 from adversely affecting filter 150 regeneration, while allowing corrections for true downward changes in the ash loading such as from a physical cleaning of the soot filter during a service event.

Figure 12:
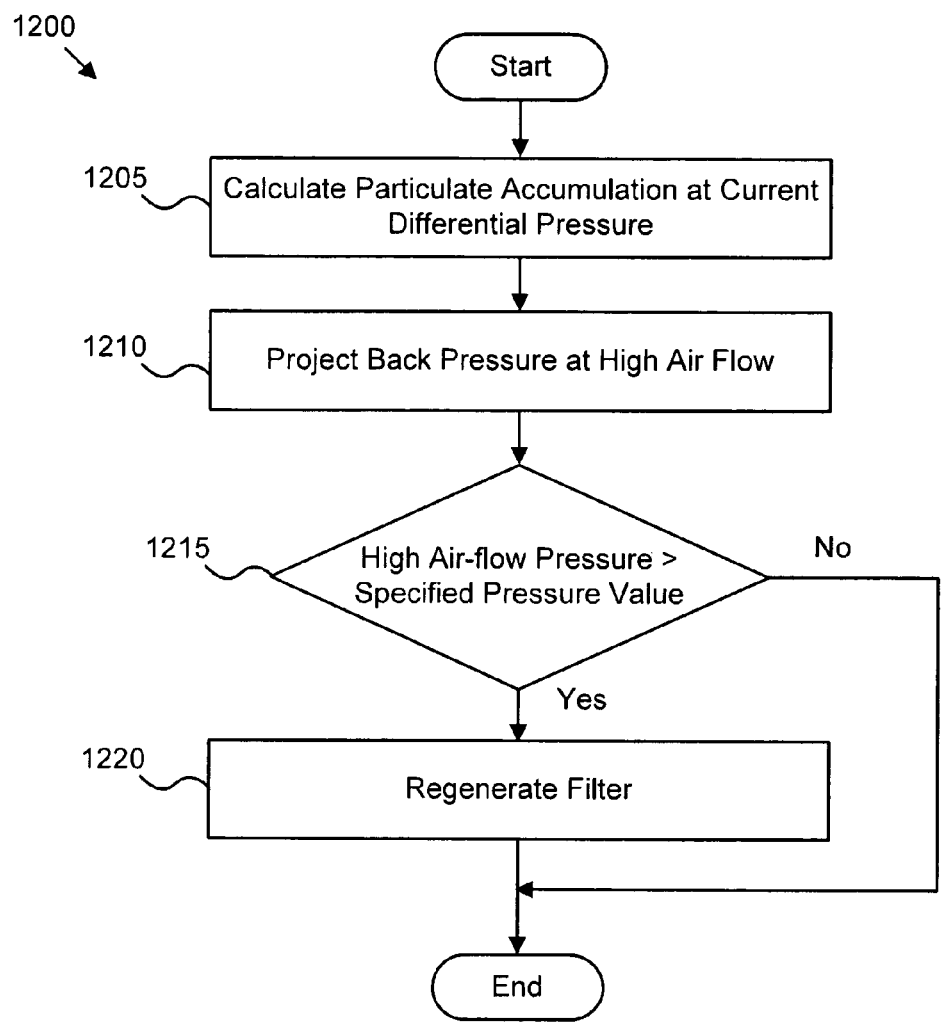
FIG. 12 is a schematic flow chart diagram illustrating one embodiment of a back pressure regeneration method of the present invention.

FIG. 12 is a schematic flow chart diagram illustrating one embodiment of a back pressure regeneration method 1200 of the present invention. The method 1200 substantially includes the steps necessary to carry out the functions presented above with respect to the operation of the described ash estimation module 210 and system 100 of FIGS. 1-7. The devices, modules, and functions of the method 1200 may be the devices, modules, and functions described in FIGS. 1-7.

In one embodiment, an interpolation module 305 calculates 1205 a particulate accumulation 765 from a differential pressure 505 and an air flow 510. A back pressure module 330 projects 1210 a high air-flow pressure 615 for a high air-flow 610. The back pressure module 330 further determines 1215 if the high air-flow pressure 615 exceeds a specified pressure value 605. If the high air-flow pressure 615 does not exceed the specified pressure value 605, the method 1200 terminates. If the high air-flow pressure 615 does exceed the specified pressure value 605, the back pressure module 330 may direct the regeneration 1220 of a filter 150 and the method 1200 terminates. In one embodiment, the back pressure module 330 directs the regeneration module 325 to initiate the regeneration 1220 of the filter 150. The method 1200 determines if the filter 150 must be regenerated 1220 to support a minimum back pressure such as the specified pressure value 605.

The present invention estimates ash accumulation as an ash accumulation estimate 745 in a filter 150 and regenerates the filter 150 if the ash accumulation exceeds an ash threshold. In addition, the present invention further estimates soot accumulation 775 and regenerates the filter 150 if the soot accumulation 775 exceeds a soot threshold. The present invention directs the filter 150 regeneration in response to the ash and soot accumulations to both maintain the performance of the filter 150 and to reduce the costs of regeneration. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to calculate ash accumulation, the apparatus comprising:
   an interpolation module configured to calculate a first particulate accumulation from an interpolation function using a differential pressure input and an air-flow input;
   an ash feedback module configured to calculate an ash accumulation as an ash feedback function of the first particulate accumulation and a stored first ash accumulation estimate;
   an ash feedforward module configured to calculate an added ash estimate using an ash feedforward function; and
   an ash accumulation module configured to calculate a second ash accumulation estimate from the sum of the ash accumulation and the added ash estimate.

2. The apparatus of claim 1, further comprising a regeneration module configured to deep clean a filter if ash accumulated since a prior deep clean exceeds an ash threshold.

3. The apparatus of claim 2, further comprising a soot calculation module configured to calculate a soot accumulation as a second particulate accumulation minus the second ash accumulation estimate and to direct the regeneration module to regenerate the filter if the soot accumulation exceeds a soot threshold.

4. The apparatus of claim 1, further comprising a back pressure module configured to project a high air-flow back pressure from a second particulate accumulation calculated from the interpolation function using the differential pressure input and the air-flow input and direct the regeneration of a filter if the back pressure projection exceeds a specified pressure value.

5. The system of claim 1, wherein the ash feedforward function is a function selected from a group consisting of a function of engine operation time, a function of fuel consumption, and a function of mileage.

6. A method for estimating ash accumulation, the method comprising:
   calculating a first particulate accumulation from an interpolation function using a differential pressure input and an air-flow input;
   calculating an ash accumulation as an ash feedback function of the first particulate accumulation and a stored first ash accumulation estimate;
   calculating an added ash estimate using an ash feedforward function; and
   calculating a second ash accumulation estimate from the sum of the ash accumulation and the added ash estimate.

7. The method of claim 6, wherein the ash accumulation is calculated using a first ash feedback function of the first particulate accumulation and the first ash accumulation estimate if the first particulate accumulation is greater than or substantially equal to the first ash accumulation estimate else the second ash accumulation is calculated using a second ash feedback function if the first particulate accumulation is less than the first ash accumulation estimate.

8. The method of claim 6, further comprising deep cleaning a filter if ash accumulated since a prior deep clean exceeds an ash threshold.

9. The method of claim 6, further comprising calculating a soot accumulation as a second particulate accumulation minus the second ash accumulation estimate.

10. The method of claim 9, wherein the soot accumulation is calculated using a soot to ash weight equivalent of the second ash accumulation estimate.

11. The method of claim 10, further comprising regenerating a filter if the soot accumulation exceeds a soot threshold.

12. The method of claim 6, wherein the interpolation function comprises a plurality of differential pressure value and air flow value pairs for a plurality of particulate functions.

13. The method of claim 12, wherein the particulate accumulation yielded by the interpolation function is a first accumulation value if the differential pressure and air-flow inputs are substantially equivalent to a first differential pressure value and air flow value pair for a first particulate function else the particulate accumulation yielded by the interpolation function is interpolated from the first and a second particulate function, wherein the differential pressure and air flow pair are bounded by the first and second particulate function.

14. The method of claim 13, wherein the particulate accumulation yielded by the interpolation function is calculated as $$(A_2 - A_1)\left(\frac{P_1 - P_1}{P_2 - P_1}\right) + A_1$$

where $P_1$ is the differential pressure input for the air flow and is between $P_1$ and $P_2$, $A_1$ is the first accumulation value of the first particulate function, $A_2$ is a second accumulation value of the second particulate function, $P_1$ is the first differential pressure value for the specified air flow of the first particulate function, and $P_2$ is a second differential pressure value for the specified air flow of the second particulate function.

15. The method of claim 6, further comprising projecting a high air-flow back pressure from a second particulate accumulation calculated from the interpolation function using the differential pressure input and the air-flow input.

16. The method of claim 15, further comprising regenerating the filter if the back pressure projection exceeds a specified pressure value.

17. A signal bearing medium tangibly embodying a program of machine-readable instructions executable by a digital processing apparatus to perform operations to estimate ash accumulation, the operations comprising:
calculating a first particulate accumulation from an interpolation function using a differential pressure input and an air-flow input, wherein the interpolation function comprises a plurality of differential pressure value and air flow value pairs for a plurality of particulate functions;
calculating an ash accumulation as an ash feedback function of the first particulate accumulation and a stored first ash accumulation estimate; and
calculating the particulate accumulation as a first particulate accumulation value if the differential pressure and air-flow inputs are substantially equivalent to a first differential pressure value and air flow value pair for a first particulate function else the particulate accumulation yielded by the interpolation function is interpolated from the first particulate function and a second particulate function.

18. The signal bearing medium of claim 17, wherein the differential pressure and air flow inputs are bounded by the first and second particulate functions.

19. The signal bearing medium of claim 17, wherein the instructions further comprise an operation to calculate the ash accumulation using a first ash feedback function of the particulate accumulation and the first ash accumulation estimate if the first particulate accumulation is greater than or substantially equal to the first ash accumulation estimate else calculate the ash accumulation using a second ash feedback function if the first particulate accumulation is less than the first ash accumulation estimate.

20. A system to estimate ash accumulation, the system comprising:
a filter configured to remove particulates;
a pressure sensor module configured to determine a differential pressure across the filter;
an air-flow sensor module configured to determine an air flow through the filter; and
a controller comprising
an interpolation module configured calculate a first particulate accumulation from an interpolation function using the differential pressure and the air flow; and
an ash feedback module configured to calculate an ash accumulation as an ash feedback function of the first particulate accumulation and a stored first ash accumulation estimate, wherein the ash accumulation is calculated using a first ash feedback function of the particulate accumulation and the first ash accumulation estimate if the first particulate accumulation is greater than or substantially equal to the first ash accumulation estimate else calculate the ash accumulation using a second ash feedback function if the first particulate accumulation is less than the first ash accumulation estimate.

21. The system of claim 20, further comprising an ash feedforward module configured to calculate an added ash estimate using an ash feedforward function selected from a function of engine operation time, a function of fuel consumption, and a function of mileage, and an ash accumulation module configured to calculate a second ash accumulation estimate from the sum of the ash accumulation and the added ash estimate.

22. The system of claim 20, further comprising a back pressure module configured to project a high air-flow back pressure from a second particulate accumulation calculated from the interpolation function using the differential pressure input and the air-flow input and direct the regeneration of the filter if the back pressure projection exceeds a specified pressure value.

23. The system of claim 20, further comprising a diesel engine and exhaust gas after-treatment system.

* * * * *